United States Patent [19]
Goldberg et al.

[11] Patent Number: 5,107,154
[45] Date of Patent: Apr. 21, 1992

[54] ELECTRO-EXPULSIVE APPARATUS AND METHOD

[75] Inventors: Joshua T. Goldberg, Woodbridge; Benjamin G. Lardiere, Jr., Milford; Bruce F. Wells, Oxford; Michael F. Bartos, Middletown, all of Conn.

[73] Assignee: Dataproducts New England, Incorporated, Wallingford, Conn.

[21] Appl. No.: 630,042

[22] Filed: Dec. 19, 1990

[51] Int. Cl.$^5$ .................... H02K 3/04; B64D 15/00
[52] U.S. Cl. .................... 310/10; 310/365; 244/134 R
[58] Field of Search .......... 310/10, 15, 365, 363, 310/273; 174/70, 40 R, 40 TD; 244/134 D, 134 R; 318/116, 132; 335/195, 196; 427/59, 117, 118; 16/DIG. 13, DIG. 14

[56] References Cited

U.S. PATENT DOCUMENTS

| | | | |
|---|---|---|---|
| 3,809,341 | 5/1974 | Levin et al. | 244/134 R |
| 4,875,644 | 10/1989 | Adams et al. | 244/134 R |
| 4,894,569 | 1/1990 | Lardier, Jr. et al. | 310/10 |
| 4,982,121 | 1/1991 | Lardier, Jr. et al. | 310/10 |

Primary Examiner—Steven L. Stephan
Assistant Examiner—Matthew Nguyen
Attorney, Agent, or Firm—Bachman & LaPointe

[57] ABSTRACT

An electro-expulsive device in the form of discrete units having a redundancy feature, minimal susceptibility to fatigue failure with a provision for transferring shock waves to and from abutting units.

16 Claims, 2 Drawing Sheets

ELECTRO-EXPULSIVE APPARATUS AND METHOD

BACKGROUND OF THE INVENTION

The present invention relates to electro expulsive devices and their method of operation.

In particular, the present invention deals with improvements over at least two prior issued patents, namely, U.S. Pat. No. 4,894,569 issued Jan. 16, 1990 to Benjamin G. Lardiere, Jr. et al. entitled ELECTRO-EXPULSIVE SEPARATION APPARATUS and U.S. Pat. No. 4,982,121 issued Jan. 1, 1991 to Benjamin G. Lardiere, Jr. et al. entitled EXPULSIVE SEPARATION APPARATUS.

Both of the above patents are assigned to a common assignee to which the present application is also assigned.

The above '569 and '121 patents, incorporated in the present application by this reference thereto, deal with an electro-expulsive separation apparatus and method wherein at least two discrete electrical conductors are enclosed in individual plastic jackets with provision for an electrical connection projecting outside the respective jackets. Both jackets are enclosed further in an outer jacket and remain separable in the outer jacket so that when the conductors are energized electrically, a magnetic field is generated causing one conductor to repel the other conductor in virtually explosive fashion whereby the outer jacket expands suddenly.

As indicated in the '569 and '121 patents, this general structure and operation is useful when the units are mounted upon a substratum to shatter and shed encrusted, solid material accumulated upon the exterior of the outer jacket.

While the devices and methods disclosed in the '569 and '121 patents are useful, cyclic and periodic "firing" of the devices, in repetitive fashion, and flexure of the substratum develop stresses that frequently result in fatigue failure of the electrical conductors particularly in the region of a metallic conductor hinge, i.e., soldered joint or return bend.

SUMMARY OF THE INVENTION

Consequently, it is a prime purpose of the present invention to provide an electro-expulsive device of the above class wherein the risk of fatigue failure of the electrical conductors is minimized, if not eliminated.

It is a further feature of the present invention to "build in" a level of redundancy in individual expulsive units (blankets), particularly in those units which are spread, side by side, upon and secured to an expansive area such as an aircraft wing, or the like, to shatter and expel encrusted matter or ice.

Redundancy is provided by interleaving one unit with another unit where both are housed in the same flexible plastic package such that the units can be "fired" individually or collectively in a manner which will become more apparent as this specification proceeds.

Thus, failure of one unit does not preclude operation of its companion unit because one unit is energized independently of the other.

All devices require at least one metallic hinge or soldered joint which is subject to repetitive bending stresses due to periodic firing and or flexure of the substratum.

In addition, the electrical conductors are subject to stresses which originate from flexure of the surface (substratum) to which the expulsive unit is attached, i.e., flexure of an aircraft propeller in flight Therefore, it is a further feature of the invention to provide a hinge structure which distributes the stress over a large area thereby minimizing fatigue failure.

It is a still further feature of the invention to provide structure which accommodates stresses which tend to generate compressive or tensile strain in electrical conductors resulting from the combination of substratum flexure and flexure due to firing the expulsive unit.

It is impractical to manufacture expulsive units in large blankets for covering large areal surfaces because failure of a conductor in a large unit would result in a serious loss of ability to shed encrusted material such as ice from the wing of large aircraft.

Furthermore, it is less expensive and more convenient to repair and/or replace small units.

However, when small units, of the order of 30 to 200 square inches in area, are utilized by abutting the units side by side to cover a large area, there is a problem in making certain that the shock wave developed upon firing is "bridged" from one unit to the next adjacent unit. That is, one must be certain that the expulsive effect is continuous from one expulsive unit to the next adjacent unit with no "dead space" between units.

Therefore, it is a further feature of the present invention to provide structure for insuring continuity or bridging the shock wave.

While it is entirely possible and fully within the principles of the present invention to manufacture and use electro-expulsive devices (in the form of blankets) of any desired size, considerations of economy of manufacture, facility of repair and level of risk are matters which dictate blanket size for a given application.

A conductor arrangement which is designed to reduce strain upon its hinge includes a pair of side by side conductor segments extending from a hinge to energizing electrodes wherein the spacing between conductor segments adjacent the hinge is greater than the spacing between conductor segments adjacent the electrodes whereby the repelling stress upon the hinge is distributed over a large area.

A conductor arrangement which provides redundancy is accomplished by interleaving or interdigitating the conductor segments of a first group of conductors with the conductor segments of a second group so that the conductor segments of the first group of conductors project toward the hinges of the second group and vice versa.

A conductor structure which is designed to adjust to compressive or tensile strain may take the form of a flat metallic strip which is formed with a plurality of wrinkles such as lands and grooves which permit the strip to elongate or compress under stress without failure or separation.

An arrangement which is operable to bridge or couple the shock wave from one expulsive unit to the other wherein the units are disposed side by side includes recessing a rigid strip in adjacent marginal segments of the jackets of the respective units so that the firing of either or both units insures that the resulting shock wave will "excite" the strip to propagate the shock wave to effect a shedding action in the joint between adjacent expulsive units.

Other features and advantages of the present invention will become more apparent from an examination of the succeeding specification when read in conjunction with the appended drawings, in which;

DETAILED DESCRIPTION OF THE INVENTION

Figure 1:
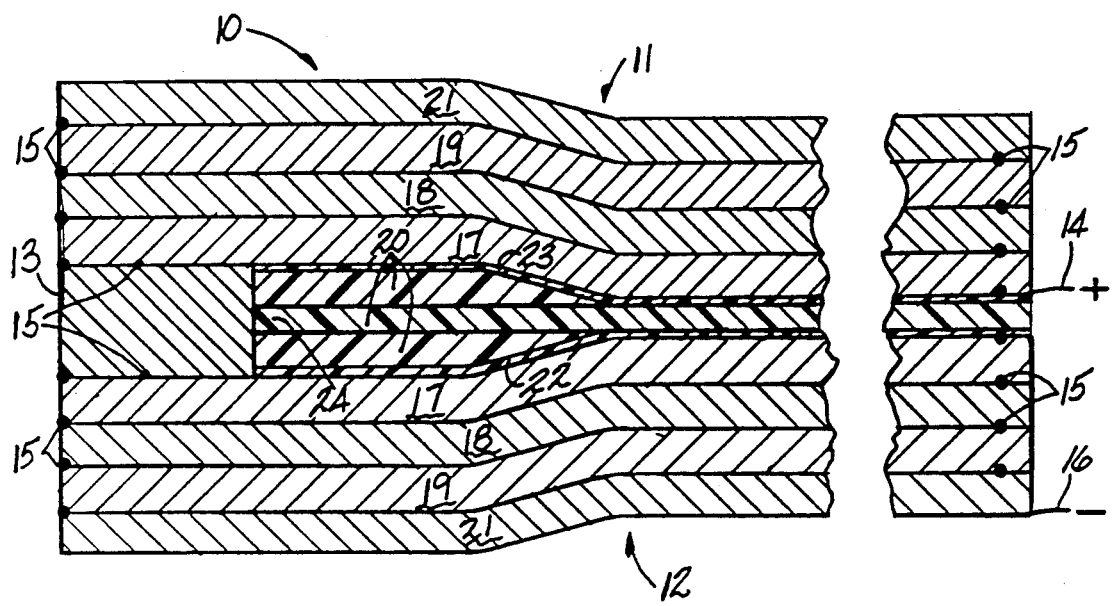
FIG. 1 is a vertical section greatly enlarged showing a typical multi-layer conductor, its hinge, its electrodes and conductor segment spacing.

Referring now to FIG. 1, the reference numeral 10 indicates an enlarged multi-layered metallic electrical conductor having conductor segments indicated generally at 11 and 12 joined at one end, electrically, by a hinge 13 and terminating at the opposite end in positive and negative electrodes 14 and 16 respectively.

While the conductor segments 11 and 12 in FIG. 1 are composed of four layers 17, 18, 19 and 21, of a thickness of 0.003 inches, joined to one another and to a hinge 13, (0.008 inches thick), a conductor of one or two layers whose conductor segment thickness is of the order of 0.002 to 0.006 inches is entirely within the spirit and scope of the invention.

The layers 17, 18, 19 and 21 of the conductor segments 11 and 12 of conductor 10 are joined electrically at the hinge 13 and at the electrodes such as by "soldering" as indicated by the reference numeral 15 for the purpose described in said '569 and '121 patents.

Note that the conductor segments 11 and 12, insulated from one another by insulators 22 and 23, are spaced widely (0.006 to 0.012 inches) in the region of the hinge 13 in contrast to the spacing (0.001 to 0.003 inches) along the remaining extent of the conductor segments.

It is sometimes desirable to fill the space between insulators 22 and 23 with lengths of elastomeric material 20 to provide stability and to aid in absorbing and distributing stress in and around the hinge 13.

As stated previously, the large gap 24 adjacent the hinge is effective to minimize fatigue failure due to flexing of the hinge in that the gap provides greater surface area over which the firing stress on the hinge can be distributed.

The inclusion of the elastomeric material 20 acts as a shock absorber as well.

Figure 2:
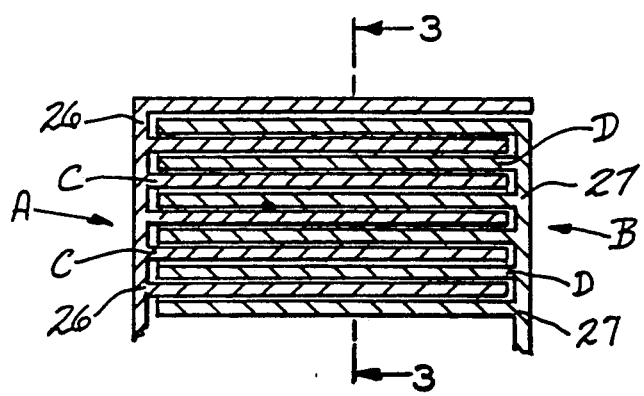
FIG. 2 is a top plan view showing schematically the interleaving or interdigitating of a first group of conductors with a second group to provide redundancy.

Referring to FIG. 2, there is shown, schematically, an arrangement of groups of conductors A and B whose conductor segments C and D, respectively, are interleaved or interdigitated to create within a single expulsive unit or blanket E two distinct, separately energized conduction groups.

That is, one group is a "back up" for the other.

Normally, both groups are "fired" simultaneously; however, should one group (A or B) fail to fire the other group operates thereby avoiding a static or non-expulsive space along a substratum.

Note that the conductors segments C of conductor group A project away from their hinges 26, while the conductor segments D of conductor group B project away from their hinges 27.

Figure 3:
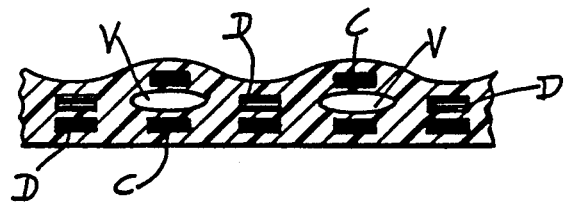
FIG. 3 is a partial vertical section of FIG. 2 in the plane 9, the line 3—3.

FIG. 3, a partial, vertical section of FIG. 2, shows graphically how the redundancy feature operates in that the conductors segments C of conductor group A have fired (repelled one another) creating void V (as disclosed and described in said '121 patent) while the conductor segments P of conductor group B did not fire.

The shedding effect was not lost because of the interleaved relationship of the conductor segments.

Figure 4:
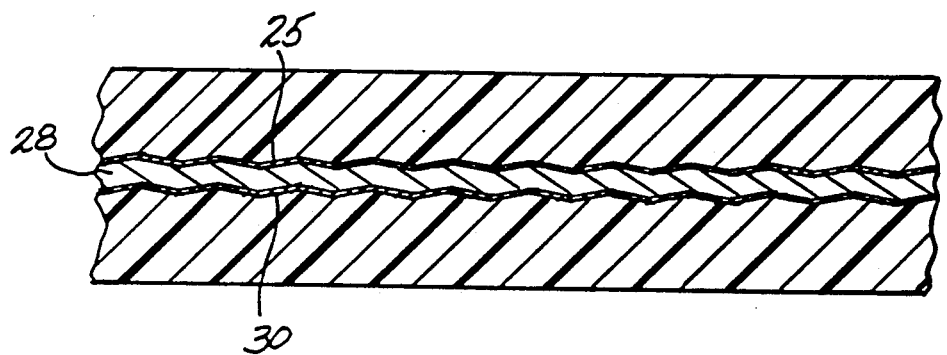
FIG. 4 is a vertical sectional view along the length of a single layer conductor showing a typical wrinkled conductor segments.

FIG. 4 shows a portion of a typical conductor segment sandwich wherein a single layer conductor segment 25 is spaced from a single layer segment 30 by an insulating ribbon 28.

This figure shows a wrinkled or mildly deformed condition of each segment 25 and 26 so that the segments are poised to respond to a tensile or a compressive stress due to firing or due to flexure of a substratum without creating excessive strain, i.e., elongation or foreshortening.

The wrinkling need not take the form of a definite pattern such as a corrugated or sinusoidal undulation and can be varied randomly as flexure considerations of the substratum or the particular application of the expulsive device dictate.

Figure 5:
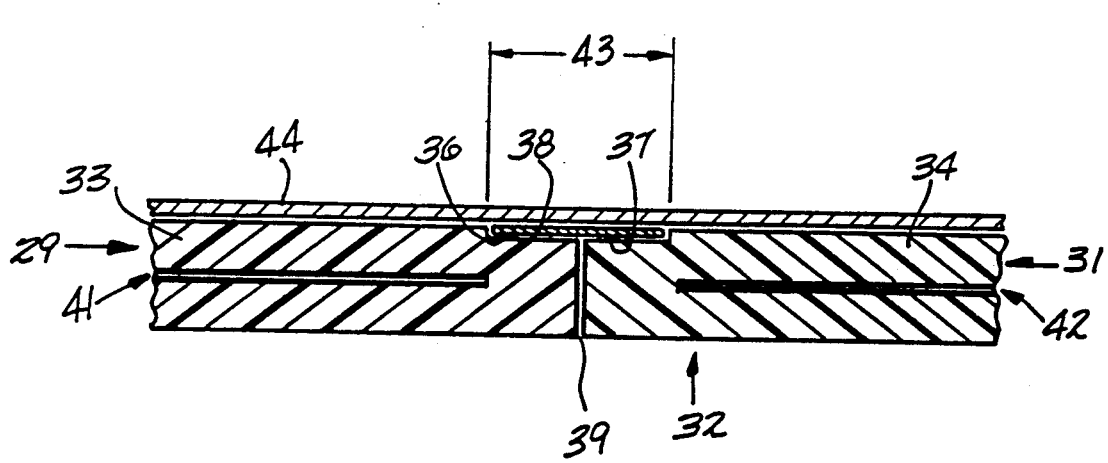
FIG. 5 is a vertical section at the joint between adjacent expulsive unit with a rigid strip, for bridging shock wave, in position over the joint.

FIG. 5 shows a vertical section of a portion of two abutting electro-expulsive devices indicated generally by the reference numerals 29 and 31 secured to a substratum 32.

The outer flexible plastic jackets 33 and 34 of each device is formed with a step or recess 36 and 37 for receiving a strip of rigid material 38 which spans the joint 39 between the two devices.

The rigid strip 38 acts to bridge the gap between conductors 41 and 42 and insures that the shock wave created when one or both of the abutting expulsive devices fires the wave will traverse the joint 39 and prevent the occurrence of a "dead", static or non-shedding region indicated by the reference numeral 43.

The specific material from which the rigid strip 38 is fabricated is not critical so long as it is sufficiently rigid to transmit the shock wave.

It has been found that suitable materials include metals such as aluminum, copper and brass, plastic materials such as nylon, mylar, and lexan of a thickness ranging from 0.003 to 0.008 inches.

It is desirable to seal the strip 38 and the expulsive devices by applying a pressure sensitive film 44 throughout as shown in FIG. 5.

A suitable film is one which inhibits rain, sand or other abrasive particles.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of minimizing hinge failure in an electro-expulsive device for shedding encrusted materials from a substratum including a sealed, flexible, plastic package containing at least one electrical conductor defining a first conductor segment disposed adjacent a second conductor segment spaced by an insulator means wherein said conductor segments are joined electrically at one end to define a hinge and terminate at the opposite ends in respective positive and negative electrodes whereby the conductor can be energized electrically in cyclic fashion effective to generate a magnetic field causing said conductor segments to repel one another periodically, comprising the steps of:
providing said hinged electrical conductor segments separated by insulator means,
arranging the conductor segments so that the space between conductor segments, in the de-energized condition, is larger adjacent the hinge than the space between conductor segments adjacent the electrodes whereby the repelling stress or load upon the hinge is distributed over an appreciable area.

2. The method of claim 1 plus the step of graduating the space between conductor segments.

3. The method of claim 1 plus the step of:
wrinkling the conductor segments between ends thereof whereby the conductor segments are free to absorb stress without causing excessive strain when the conductor is energized or when the substratum flexes.

4. The method of claim 3 wherein the wrinkling defines a plurality of lands and groves extending transversely of said conductor segments.

5. A method of arranging conductors in an electro-expulsive device for shedding encrusted materials from a substratum including a sealed, flexible, plastic package containing a plurality of electrical conductors, each conductor defining first and second conductor segments spaced by an insulator means wherein said conductor segments are joined electrically at one end to define a hinge and terminate at opposite ends in respective positive and negative electrodes whereby the conductor can be energized electrically in cyclic fashion effective to develop a magnetic field causing said conductor segments to repel one another periodically, comprising the steps of,
disposing the conductor segments of a first and a third conductor so that they straddle the conductor segments of a second conductor, and
positioning the electrodes of the conductor segments of the first and third conductors so that said electrodes project toward the hinge of the second conductor.

6. The method of claim 5 plus the step of spacing the conductor segments of said first and third conductors from the conductor segments of said second conductor.

7. The method of claim 5 plus the step of dividing the conductors into at least two groups defining a first conductor group and a second conductor group and the conductors segments of said first group are positioned so that they alternate relative to the position of the conductors segments of the second group.

8. The method of claim 7 plus the step of disposing the hinges of the first group of conductors opposite to the hinges of said second group of conductors.

9. The method of claim 5 plus the step of energizing the first conductor independently of the energization of the second conductor.

10. The method of claim 5 plus the step of energizing the first and second conductors simultaneously.

11. A method of arranging a plurality of said sealed flexible plastic packages of the type describe din claim 1 upon a substratum comprising the steps of:
providing a plurality of said packages,
securing a first package upon said substratum, securing a second package upon said substratum in abutting relationship with said first package, and
bridging said packages with a rigid strip of material whereby the shock or pressure wave developed in one package upon energization is transmitted to the abutting package thereby avoiding a static condition between packages.

12. The method of claim 11 plus the step of covering the abutting packages and the rigid strip of material with a protective skin.

13. An electro-expulsive device for shedding encrusted materials from a substratum including a sealed, flexible, plastic package containing at least one electrical conductor defining a first conductor segment disposed adjacent a second conductor segment spaced by an insulator means wherein said conductor segments are joined electrically at one end to define a hinge and terminate at opposite ends in positive and negative electrodes, respectively, whereby the conductor can be energized electrically in cyclic fashion effective to generate a magnetic field causing said conductor segments to repel one another periodically, the improvement comprising:
conductor segments which are spaced apart adjacent the hinge a distance which is greater than the spacing of the segments adjacent the electrodes.

14. The device of claim 13 wherein the conductor segments are formed with a plurality of wrinkles defining concave and convex shapes whereby the segments accommodate stress thereby minimizing fatigue failure.

15. The device of claim 13 wherein the plastic package contains a plurality of electrical conductors divided into at least two groups and the conductor segments of a first group are interleaved with the conductor segments of a second group.

16. In an arrangement wherein individual electro-expulsive devices are positioned side by side in abutting relationship upon a substratum with a joint therebetween, means for insuring the propagation of shock waves for one device to the next adjacent device when one device is energized comprising,
a rigid strip of material selected from the group consisting of aluminum, copper, brass, nylon, mylar and lexan spanning said joint, and
a protective film overlaying said rigid strip and segments of said devices adjacent said joint for securing said strip.

* * * * *